(12) United States Patent
Grootaert et al.

(10) Patent No.: US 6,730,760 B2
(45) Date of Patent: May 4, 2004

(54) PERFLUOROELASTOMERS HAVING A LOW GLASS TRANSITION TEMPERATURE AND METHOD OF MAKING THEM

(75) Inventors: Werner M. A. Grootaert, Oakdale, MN (US); Klaus Hintzer, Woodbury, MN (US); Franz März, Burgkirchen (DE); Guy Van Gool, Melsele (BE); Allan T. Worm, North Saint Paul, MN (US); Erik D. Hare, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/009,759
(22) PCT Filed: Jan. 31, 2001
(86) PCT No.: PCT/US01/03195
§ 371 (c)(1), (2), (4) Date: Dec. 11, 2001
(87) PCT Pub. No.: WO02/060968
PCT Pub. Date: Aug. 8, 2002

(65) Prior Publication Data
US 2002/0198345 A1 Dec. 26, 2002
(Under 37 CFR 1.47)

(51) Int. Cl.$^7$ ............................................. C08F 116/12
(52) U.S. Cl. ..................... 526/247; 526/249; 526/250; 525/326.3
(58) Field of Search ................. 526/247, 249, 526/250; 525/326.3

(56) References Cited

U.S. PATENT DOCUMENTS

| | | | |
|---|---|---|---|
| 4,000,356 A | 12/1976 | Weisgerber et al. | 526/206 |
| 4,316,836 A * | 2/1982 | Aufdermarsh, Jr. | 524/90 |
| 4,418,186 A | 11/1983 | Yamabe et al. | 526/247 |
| 4,501,869 A | 2/1985 | Tatemoto et al. | 526/249 |
| 4,513,128 A | 4/1985 | Uschold | 526/212 |
| 4,619,983 A | 10/1986 | Yamabe et al. | 526/247 |
| 4,766,190 A | 8/1988 | Morita et al. | 526/247 |
| 5,285,002 A | 2/1994 | Grootaert | 526/222 |
| 5,565,512 A | 10/1996 | Saito et al. | 525/340 |
| 5,639,837 A | 6/1997 | Farnham et al. | 526/222 |
| 5,639,838 A | 6/1997 | Albano et al. | 526/247 |
| 5,648,430 A * | 7/1997 | Chiodini et al. | 525/415 |
| 5,668,221 A | 9/1997 | Saito et al. | 525/359.3 |
| 5,677,389 A | 10/1997 | Logothetis et al. | 525/340 |
| 5,696,216 A * | 12/1997 | Kruger et al. | 526/247 |
| 5,877,264 A | 3/1999 | Logothetis et al. | |
| 5,891,974 A * | 4/1999 | Saito et al. | 526/247 |
| 5,969,067 A | 10/1999 | Brothers et al. | |
| 6,294,627 B1 * | 9/2001 | Worm et al. | 526/247 |
| 6,602,968 B1 * | 8/2003 | Bekiarian et al. | 526/255 |

FOREIGN PATENT DOCUMENTS

| | | | | |
|---|---|---|---|---|
| DE | 38 23 278 A | 1/1989 | ......... | C08F/214/26 |
| EP | 0 130 052 A1 | 1/1985 | ......... | C08F/214/18 |
| EP | 0 230 138 A2 | 7/1987 | | |
| EP | 0 661 304 A1 | 7/1995 | ......... | C08F/214/18 |
| EP | 0 769 521 A1 | 4/1997 | ............ | C08K/5/14 |
| EP | 0 784 064 A1 | 7/1997 | ......... | C08F/214/18 |
| WO | WO 99/48939 | 9/1999 | ......... | C08F/214/26 |
| WO | WO 00/08076 | 2/2000 | ......... | C08F/214/26 |
| WO | WO 00/52060 | 9/2000 | ............ | C08F/2/18 |

OTHER PUBLICATIONS

Published Application WO01/57100 (Copending Application U.S. Ser. No. 09/495,600, "Ultra–Clean Fluoropolymers").
Barney et al, *Journal of Polymer Science* A–1, vol. 8, pp. 1091–1098 (1970).
Modern Fluoropolymers, edited by John Scheirs, Wiley Science, 1997, pp. 207–222 and 349–358.
El–Aasser et al., "Features of Emulsion Polymerization", *Emulsion Polymerization and Emulsion Polymers*, Chapter 2, pp. 37–41, 1997.

* cited by examiner

*Primary Examiner*—David W. Wu
*Assistant Examiner*—Henry S. Hu
(74) *Attorney, Agent, or Firm*—Dean M. Harts

(57) ABSTRACT

A method of making a curable fluoroelastomer is disclosed. The method comprises the steps of
  preemulsifying at least one perfluorovinylether in water, and
  copolymerizing the preemulsified perfluorovinylether with a gaseous fluorinated monomer in the presence of a cure site monomer. The method provides a fluoroelastomer having a glass transition temperature of less than −10° C. Also disclosed is a fluoroelastomer that consists essentially of a perfluorovinylether of formula (I) as defined below, a cure site component, perfluoromethylvinylether, and tetrafluoroethylene and/or chlorotrifluoroethylene.

16 Claims, No Drawings

PERFLUOROELASTOMERS HAVING A LOW GLASS TRANSITION TEMPERATURE AND METHOD OF MAKING THEM

1. FIELD OF THE INVENTION

The present invention relates to fluoroelastomers that have a low glass transition temperature, i.e. that have a glass transition temperature of −10° C. or less and to a method of making them. More particularly, the present invention relates to (per)fluoroelastomers that are derived from a fluorinated olefin selected from the group consisting of tetrafluoroethylene, chlorotrifluoroethylene, perfluoromethyl vinyl ether and mixtures thereof and one or more liquid perfluorovinylethers.

2. BACKGROUND OF THE INVENTION

Fluoroelastomers and in particular perfluoroelastomers such as those described in "Modern Fluoropolymers", edited by John Scheirs, Wiley Science 1997, offer excellent protection against high service temperatures and are resistant to a wide variety of chemical reagents. Fluoroelastomers are generally divided in two main classes, namely those that are based on vinylidene fluoride (VF2) and those that do not contain VF2 and are based on perfluoromethylvinyl ether (PMVE), and tetrafluoroethylene (TEE) and/or chlorotrifluoroethylene (CTFE). Fluoroelastomers based on VF2 are disclosed in for example U.S. Pat. No. 5,696,216, U.S. Pat. No. 5,639,838, U.S. Pat. No. 4,418,186 and U.S. Pat. No. 4,619,983. VF2 based fluoroelastomers generally have a lower chemical and heat resistance as compared to fluoroelastomers that are based on TFE/CTFE and PMVE. Unfortunately, these latter fluoroelastomers have the disadvantage that the glass transition temperature is somewhat high thereby limiting their low temperature performance. Various approaches are known to lower the Tg of these fluoroelastomers.

Barney et al (J. Poly. Sci. A-1, 8, 1091–1098 (1970)) described the addition of Krytox® perfluoroalkyl polyether oils to lower $T_g$. However, these plasticizers can be extracted by solvents over time.

Uschold (U.S. Pat. No. 4,513,128) describes perfluoroterpolymers consisting of tetrafluoroethylene, perfluoromethyl vinylether and at least 3 mol % of long chain vinylethers:

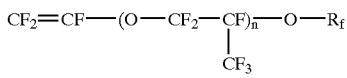

n=3–30. The long-chain vinylether lowers the $T_g$ significantly, however the incorporation is rather difficult. Therefore, one has to run the polymerization in perhalogenated solvents (e.g. R 113) or in aqueous emulsion polymerization in the presence of fluorinated alcohols. The disadvantages of these systems are: the use of perhalogenated solvents (e.g. R 113) is often critical due to environmental concerns and the removal of the fluorinated alcohols is often very difficult because they act as swelling agents.

U.S. Pat. No. 4,766,190 discloses the aqueous emulsion polymerization of tetrafluoroethylene, hexafluoropropylene and perfluorovinylethers of the formula $CF_2=CFO-(CF_2CFXO)_m-R_f$ wherein X is F or $CF_3$, m is 1 to 50 and $R_f$ is a perfluoroalkyl group. Although the disclosed fluoroelastomers have a low $T_g$, their method of making involves polymerization times of up to 28 hours (see Example 1), making their manufacturing expensive.

U.S. Pat. No. 5,891,974 describes the aqueous emulsion polymerization of tetrafluoroethylene and perfluorovinylethers:

$CF_2=CF-O-(CF_2)_2(OCF_2)_nOCF_3$ n=1–5. However, the polymerization process disclosed to make these fluoroelastomers, is again in the order of 30 hours.

WO 99/48939 discloses peroxide curable perfluoroelastomers of a perfluoro-olefin, a perfluorovinyl ether, including a perfluoroalkyl vinyl ether and a halogen containing cure site. The perfluoroelastomers are produced by an aqueous emulsion polymerization.

It would now be desirable to improve the process of making fluoroelastomers that are based on a perfluorovinylether, and TFE and/or CTFE in particular to make the process less cumbersome and more cost effective. It would further be desirable to obtain fluoroelastomers with beneficial properties such as good cure properties and good mechanical and physical properties when cured.

3. SUMMARY OF THE INVENTION

The present invention provides a process of making a curable fluoroelastomer comprising the steps of:

pre-emulsifying one or more liquid perfluorovinylethers in water with the aid of a fluorinated emulsifier to obtain an aqueous emulsion, said liquid perfluorovinylether corresponding to the formula:

$$CF_2=CF(O(CF_2)_n)_m(OCF_2)_xOR_f \qquad (I)$$

wherein n represents an integer of 1 to 6, In represents an integer of 1 to 3, x represents an integer of 0 to 3, with the proviso that the sum of x and m is at least 3 when n equals 1 and $R_f$ represents a perfluoroalkyl group having 1 to 6 carbon atoms; and copolymerizing said pre-emulsified liquid perfluorovinylethers with a gaseous fluorinated monomer selected from the group consisting of tetrafluoroethylene, chlorotrifluoroethylene, perfluoromethylvinyl ether and mixtures thereof in the presence of one or more cure site component;

the amount of said one or more liquid perfluorovinyl ethers being sufficient so as to obtain a fluoroelastomer having a glass transition temperature of less than −10° C.

It has been found that the above process allows for a substantially faster polymerization reaction than the polymerization processes disclosed in the prior art. In particular, it was found that by preemulsifying the liquid perfluorovinyl ether of the above formula prior to its copolymerization with the other comonomers, the polymerization time can be reduced and the incorporation is high. Fluoroelastomers having a low $T_g$ and desirable physical and mechanical properties can thus be obtained in a convenient and cost effective way.

By the term "liquid perfluorovinylether" is meant that the perfluorovinylether is generally present as a liquid at ambient conditions of temperature and pressure, i.e. at a temperature of 20° C. and a pressure of 1 atm. By the term "pre-emulsified" in connection with the present invention is meant that the perfluorovinylether is emulsified in water with the aid of the fluorinated emulsifier prior to polymerization of the liquid perfluorovinylether. The term aqueous emulsion is to be understood as a liquid emulsified in water that generally has a milky appearance generally having a settling time of at least 1 hour. Such settling time is generally achieved using a non-telogenic fluorinated emulsifier other than a fluorinated polyether emulsifier. By the term "boiling point" in connection with the present invention is meant a boiling point under ambient conditions, i.e. at a pressure of about 1 atm. By the term "gaseous" in connection with the present invention is meant that the respective compounds are present as a gas under ambient conditions of temperature and pressure, i.e. at a temperature of about 20° C. and a pressure of about 1 atm.

Particularly preferred fluoroelastomers that can be obtained with the process of the invention are those that consist essentially of 15 to 45 mol %, preferably 20–35 mol % of repeating units derived from one or more liquid perfluorovinyl ethers of formula (I), 0.1 to 5 mol %, preferably 0.2 to 3 mol % especially preferred 0.4–2 mol % of cure site component, at least 50 mol % of units derived from a gaseous fluorinated monomer selected from the group consisting of tetrafluoroethylene, chlorotrifluoroethylene, perfluoromethylvinyl ether and mixtures thereof and 0 to 10 mol % of repeating units derived from further perfluorinated monomers other than said liquid perfluorovinyl ether and said gaseous fluorinated monomer.

An especially preferred fluoroelastomer that can be obtained with the process of the invention consists essentially of:

(a) 15 to 35 mol % of repeating units derived from one or more liquid perfluorovinyl ethers of formula (I), (b) 0.1 to 5 mol % of cure site component, (c) 1 to 15 mol % of repeating units derived from perfluoromethylvinylether, (d) at least 50 mole % of repeating units derived from tetrafluoroethylene and/or chlorotrifluoroethylene;

and the sum of (a)+(b)+(c)+(d) adding up to 100 mol %. These polymers often show better product properties (e.g., lower hardness and lower compression sets) when compared to polymers having the same or very similar glass transition points but having no perfluoromethylvinylether incorporated.

The invention also provides a curable fluoroelastomer composition comprising the preferred and especially preferred fluoroelastomers set forth above and to a shaped fluoroelastomer article that can be obtained by curing such curable fluoroelastomer compositions.

4. DETAILED DESCRIPTION

The perfluorovinyl ethers used in the process of the invention correspond to the general formula:

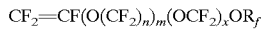

wherein n represents an integer of 1 to 6, m represents an integer of 1 to 3, x represents an integer of 0 to 3, with the proviso that the sum of x and m is at least 3 when n equals 1 and $R_f$ represents a perfluoroalkyl group having 1 to 6 carbon atoms.

$R_f$ in the above formula can be a linear, branched or cyclic perfluoroalkyl group. Examples of $R_f$ groups include $CF_3$—, $CF_3CF_2$—, $CF_3CF_2CF_2$— and $CF_3CF(CF_3)$—. The perfluorovinyl ether is used as a comonomer to achieve a perfluoroelastomers with a low Tg, i.e. a Tg of −10° C. or less, preferably −15° C. or less, more preferably −18° C. or less. To achieve the desired Tg, a sufficient amount of the perfluorovinyl ether should be used. Generally, this amount will be such so as to obtain a fluoroelastomer containing between 10 mol % and 50 mol % of repeating units derived from the perfluorovinyl ether, preferably between 15 mol % and 45 mol %, most preferably between 20 mol % and 35 mol %.

A preferred class of perfluorovinyl ether for use in the process of the invention corresponds to the following formula:

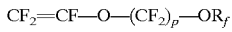

wherein $R_f$ has the same meaning as defined above and wherein p is an integer of 2 to 4. Examples of such monomers include those wherein p is 2 or 3 and wherein $R_f$ represents perfluoromethyl.

Further perfluorovinyl ethers that can be used in the process of this invention include those that correspond to the formula:

wherein $R_f$ has the same meaning as defined above and wherein r is an integer of 1 to 3.

In accordance with the process of the present invention, the liquid perfluorovinylether of formula (I) is emulsified in water with the aid of a fluorinated emulsifier prior to its copolymerization with the gaseous fluorinated monomers. The pre-emulsification of the liquid fluorinated monomer preferably results in an emulsion having monomer droplets of a diameter of 1 μm or more, typically it is expected the range of 1 to 20 μm. The aqueous emulsion should preferably have a pot life (settling time) of at least 1 hour, more preferably at least 3 hours. The pot life or settling time is defined as the time required for 10% by weight of the monomer droplets to settle or separate out of the aqueous emulsion.

Aqueous emulsions of the liquid perfluorovinylether of formula (I) can conveniently be obtained by suitable emulsification equipment such as for example a dispersing device such as Ultra-Turrax. The stirring rates should be sufficiently high to achieve the desired degree of emulsification and stability. Generally, stirring rates of 24 000 rpm or more can be employed. According to indication of the supplier of the Ultra-Turrax device, the resulting emulsions would have a droplet size of 1 to 10 μm. Air is preferably excluded during the emulsification.

Fluorinated emulsifiers for preparing the aqueous emulsion of the liquid perfluorovinylether of formula (I) are preferably non-telogenic emulsifiers. Examples of fluorinated emulsifiers include salts, in particular ammonium salts of linear or branched perfluoro alkyl carboxylic and sulphonic acids having 6 to 11 carbon atoms in the alkyl chain. It was found that salts of branched perfluoroalkyl carboxylic and sulphonic acids are more effective than their linear counter parts. Specific examples include perfluorooctanoic acid ammonium salt (APFOA) and $C_8F_{17}SO_3Li$. Commercially available fluorinated emulsifiers that can be used include $C_8F_{17}SO_3Li$ available as FT 208 from Bayer AG, and $C_8F_{17}SO_2N(C_2H_5)CH_2COOK$ available from 3M as FC 128.

However, APFOA is the preferred emulsifier as it can be more readily removed from the polymerization product at the end of polymerization. Typically, APFOA is very volatile and decomposes at temperatures of 180° C. or more leading to volatile products. Therefore, APFOA type of emulsifiers can be easily removed during work-up of the fluoropolymers.

The pot life of the aqueous emulsion of the liquid perfluorovinyl ether of formula (I) can be increased by increasing the pH. For example, with APFOA, the pot life can be increased to 50 hours or more at a pH of 7 or more. Typically, the pH of the aqueous emulsion can be increased by adding ammonia or alkali metal hydroxides.

The amount of fluorinated emulsifier used to emulsify the liquid perfluorovinyl ethers of formula (I) is generally between 0.1 and 1% by weight based on the weight of the water phase. Although higher amounts of emulsifier can be used, they will not necessarily lead to a significant increased pot life of the aqueous emulsion. Further, the use of high amounts of emulsifier is not preferred because the emulsifier generally needs to be removed after polymerization, making the process less effective.

The aqueous emulsion of the liquid perfluorovinyl ether of formula (I) may include a mixture of liquid perfluorovinyl ethers of formula (I) and may further comprise other monomers such as other poorly water soluble and liquid monomers. Additional emulsifier may be added and if added, they are preferably identical to the emulsifier(s) used to pre-emulsify the liquid perfluorovinyl ether of formula (I). Advantageously, APFOA is used in the emulsification of the liquid perfluorovinyl ether of formula (I) and in the subsequent aqueous emulsion polymerization.

The pre-emulsification of the liquid perfluorovinyl ether of formula (I) may proceed in a separate vessel from the polymerization vessel, in the polymerization vessel itself prior to commencing the polymerization or in the monomer supply line to the polymerization vessel.

According to a particular embodiment of the process of the invention, the aqueous emulsion of the perfluorovinyl ether of formula (I) is mixed with tetrafluoroethylene (TFE), chlorotrifluoroethylene (CTFE), perfluoromethylvinylether (PMVE) or mixtures thereof and with one or more cure site component. The amount of TFE, CTFE and/or PMVE is generally such that a fluoroelastomer is obtained that contains at least 50 mol % of repeating units derived from these monomers. Preferably, the amount of units derived from TFE and/or CTFE is at least 50 mol % and the amount of repeating units derived from PMVE is between 1 and 15 mol %. The amount of liquid perfluorovinyl ether of formula (I) is generally such that the resulting fluoroelastomer will have between 15 and 45 mol %, preferably between 20 and 35 mol % of repeating units derived therefrom. Further emulsifier may be added in the polymerization. The polymerization is generally conducted in the presence of an inorganic free radical initiator system such as ammonium persulfate or potassium permanganate. The polymerization reaction may further include other components such as chain transfer agents and complexing agents. The polymerization is generally carried out at a temperature between 10° C. and 100° C., preferably between 30° C. and 80° C. The polymerization pressure is usually between 3 bar and 20 bar, preferably between 5 bar and 15 bar.

The polymerization reaction may involve further fluorinated monomers other than the gaseous fluorinated monomer, cure site monomers and liquid perfluorovinyl ether of formula (I). Such further fluorinated monomers include for example hexafluoropropylene.

The aqueous emulsion polymerization can be carried out continuously under steady-state conditions in which, for example, the aqueous emulsion of the perfluorovinyl ether of formula (I) and the other monomers, water, emulsifiers, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomers into the reactor to maintain a constant pressure until a desired amount of polymer is formed.

The free-radical polymerization process can also be carried out in the presence of a perfluorosulfinate and an oxidizing agent to improve the processability of the resulting perfluoroelastomer composition. Such oxidizing agents are water soluble and capable of converting the sulfinate to a sulfonyl moiety. The produced sulfonyl radical is believed to eliminate $SO_2$ and form a fluorinated radical that initiates the polymerization of the ethylenically unsaturated monomers. A number of useful oxidizing agents are known as taught in U.S. Pat. No. 5,285,002 and U.S. Pat. No. 5,639,837. Representative examples of such useful oxidizing agents are sodium, potassium, and ammonium persulfates, perphosphates, perborates, percarbonates, bromates, chlorates and hypochlorites. Other useful oxidizing agents include cerium IV compounds such as $(NH_4)_2Ce(NO_3)_6$. The amount of oxidizing agent used can vary depending on the particular oxidizing agent and sulfinate employed. Typically an equimolar amount or less (based on the amount of sulfinate) is used.

Perfluorosulfinates useful for this purpose include those described in U.S. Pat. No. 5,285,002 and represented by the general formula:

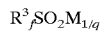

or

where:
$R^3_f$ represents a monovalent fluoroaliphatic radical having, for example, from 1 to 20 carbon atoms, preferably 4 to 10 carbon atoms;

$R^2_f$ represents a polyvalent, preferably divalent, fluoroaliphatic radical having, for example, from 1 to 20 carbon atoms, preferably from 2 to 10 carbon atoms;

M represents a hydrogen atom or cation with valence q, which is 1 or 2; and j is 1 to 4, preferably 1 or 2.

The amount of fluoroaliphatic sulfinate employed in the polymerization process can vary, depending, for example, on the molecular weight of polymer desired. Preferably the amount of fluoroaliphatic sulfinate is from 0.01 to 50 mole percent, and most preferably from 0.05 to 10 mole percent, of sulfinate compound based on total quantity of monomers.

In addition to the sulfinate, other reducing agents can be present, such as sodium, potassium or ammonium sulfites, bisulfite, metabisulfite, hyposulfite, thiosulfite, phosphite, sodium or potassium formaldehyde sulfoxylate or hypophosphite. Activators such as ferrous, cuprous, and silver salts, may also be present.

If oil-soluble initiators are used in the polymerization, it is generally preferred for these to be mixed with the aqueous emulsion of the liquid perfluorovinyl ether of formula (I). For the purpose of the present invention, oil-soluble initiators are those which have no, or only insufficient solubility in water. Examples include substituted dibenzoyl peroxides, cumene hydroperoxides, in particular bisperfluoropropionyl peroxide.

The cure site component is included in the polymerization reaction to obtain a curable fluoroelastomer. Generally, the cure site component will be used in small amounts, typically in amounts so as to obtain a fluoroelastomer that has between 0.1 and 5 mol % of cure sites, preferably 0.2 to 3 mol % and most preferred 0.4–2 mol %.

The cure site component may comprise a nitrile group-containing cure site monomer. The cure site component can be partially or fully fluorinated. It will be understood that when the cure site component is fully fluorinated, the resulting polymer will be perfluorinated, and that when the cure site component is partially fluorinated, the resulting polymer will still be highly fluorinated. Preferred useful nitrile group-containing cure site monomers include nitrile-containing fluorinated olefins and nitrile-containing fluorinated vinyl ethers, such as depicted below:

$CF_2=CF-CF_2-O-R_f-CN$ $CF_2=CFO(CF_2)_lCN$ $CF_2=CFO[CF_2CF(CF_3)O]_g(CF_2O)_vCF(CF_3)CN$ $CF_2=CF[OCF_2CF(CF_3)]_kO(CF_2)_uCN$ where, in reference to the above formulas: l=2–12; g=0–4; k=1–2; v=0–6; and u=1–4, $R_f$ is a perfluoroalkylene or a bivalent perfluoroether group. Representative examples of such a monomer include perfluoro(8-cyano-5-methyl-3,6-dioxa-1-octene), $CF_2=CFO(CF_2)_5CN$, and $CF_2=CFO(CF_2)_3OCF(CF_3)CN$.

Alternatively, the cure site component may comprise a fluorinated monomer having a halogen capable of participation in a peroxide cure reaction. Typically the halogen is bromine or iodine. Suitable cure-site components include terminally unsaturated monoolefins of 2 to 4 carbon atoms such as bromodifluoroethylene, bromotrifluoroethylene, and iodotrifluoroethylene. Examples of other suitable cure site components include $CF_2=CFOCF_2CF_2Br$, $CF_2=CFOCF_2CF_2CF_2Br$, and $CF_2=CFOCF_2CF_2CF_2OCF_2CF_2Br$. Preferably, all or essentially all of these components are ethylenically unsaturated monomers.

Still further useful cure-site components are brominated or iodinated chain transfer agents and initiators. Examples of useful chain transfer agents include perfluoroalkyl bromides or iodides (see U.S. Pat. No. 4,501,869; 4,000,356). Examples of useful initiators include $X-(CF_2)_n-SO_2Na$ (X=Br,I CN). Nitrile containing chain transfer agents e.g., $I-(CF_2)_n-CN$ are also useful.

When a liquid cure site monomer is used to include the cure sites into the fluoroelastomer, it will generally be preferred that such liquid cure site monomer is pre-emulsified, i.e. is emulsified in water with the aid of a fluorinated emulsifier prior to its copolymerization. Conveniently, such liquid cure site monomer can be pre-emulsified together with the liquid perfluorovinyl ethers of formula (I). Pre-emulsification of the liquid cure site monomer ensures an almost quantitive incorporation. Especially in case of the generally expensive nitrile containing vinylethers as cure site components it is highly desired to pre-emulsify them to ensure good and effective incorporation.

It will be appreciated by one skilled in the art that the pre-emulsification of liquid cure site monomers will also be beneficial in the process of making other fluoroelastomers than those of the present invention, which include repeating units derived from a liquid perfluorovinyl ether of formula (I). Thus, in a particular aspect, the present invention also provides a method of making curable fluoroelastomers having as a cure site, a cure site that is derived from a liquid cure site monomer, in particular a nitrile group containing liquid cure site monomer, the method comprising the steps of:

pre-emulsifying one or more liquid cure site monomers in water with the aid of a fluorinated emulsifier to obtain an aqueous emulsion and copolymerizing the pre-emulsified liquid cure site monomers with one or more gaseous fluorinated monomers.

Suitable gaseous fluorinated monomers include those mentioned above as well as vinylidenefluoride.

To cure fluoroelastomers that include a halogen capable of participation in a peroxide cure reaction, peroxides are used to cure the fluoroelastomer. Suitable peroxide curatives are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and bis[1,3-dimethyl-3-(t-butylperoxy)-butyl]carbonate. Generally, about 1–3 parts of peroxide per 100 parts of perfluoroelastomer is used.

Another material which is usually blended with the composition as a part of the curative system is a coagent composed of a polyunsaturated compound which is capable of cooperating with the peroxide to provide a useful cure. These coagents can be added in an amount equal to 0.1 and 10 parts per hundred parts perfluoroelastomer, preferably between 2–5 parts per hundred parts fluoroelastomer. Examples of useful coagents include triallyl cyanurate; triallyl isocyanurate; tri(methylallyl isocyanurate; tris (diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate. Other useful coagents include the bis-olefins disclosed in EPA 0 661 304 A1, EPA 0 784 064 A1 and EPA 0 769 521 A1.

When the fluoroelastomer includes a nitrile containing cure site component, a catalyst comprising one or more ammonia-generating compounds may be used to cause curing. "Ammonia-generating compounds" include compounds that are solid or liquid at ambient conditions but that generate ammonia under conditions of cure. Such compounds include, for example, hexamethylene tetramine (urotropin), dicyan diamid, and metal-containing compounds of the formula:

$A^{w+}(NH_3)_vY^{w-}$ where $A^{w+}$ is a metal cation such as $Cu^{2+}$, $Co^{2+}$, $Co^{3+}$, $Cu^+$, and $Ni^{2+}$; w is equal to the valance of the metal cation; $Y^{w-}$ is a counterion, typically a halide, sulfate, nitrate, acetate or the like; and v is an integer from 1 to about 7.

Also useful as ammonia-generating compounds are substituted and unsubstituted triazine derivatives such as those of the formula:

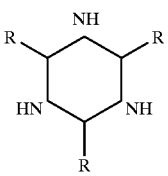

wherein R is a hydrogen or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer.

The fluoroelastomers including a nitrile containing cure site component can also be Cured using one or more peroxide curatives along with the ammonia generating catalysts. Suitable peroxide curatives for this purpose include those listed above. It will further be understood by one skilled in the art that the curable fluoroelastomer may include a mixture of cure site components, such as a mixture of nitrile containing cure sites and cure sites including a halogen capable of participating in a peroxide cure reaction. In the latter case, a mixture of ammonia generating compounds and peroxides will generally be employed.

To cure the nitrile containing perfluoroelastomers all other well-known compounds can be used, like amino phenols (U.S. Pat. No. 5,677,389), ammonia salts (U.S. Pat. No. 5,565,512), amidoxines (U.S. Pat. No. 5,668,221) and other ammonia generating comp (PCT 00/09603).

The curable fluoroelastomer obtained by the process of the present invention can be used to prepare a curable fluoroelastomer composition. Such composition will generally include the curable fluoroelastomer and one or more curatives such as the peroxide and/or one or more catalysts such ammonium generating compounds depending on the type of cure sites contained in the curable fluoroelastomer. Additives, such as carbon black, stabilizers, plasticizers, lubricants, fillers, and processing aids typically utilized in fluoroelastomer compounding can be incorporated into the compositions, provided they have adequate stability for the intended service conditions.

Carbon black fillers are typically also employed in elastomers as a means to balance modulus, tensile strength, elongation, hardness, abrasion resistance, conductivity, and processability of the compositions. Suitable examples include MT blacks (medium thermal black) designated N-991, N-990, N-908, and N-907, and large particle size furnace blacks. When used, 1–70 phr of large size particle black is generally sufficient.

Fluoropolymer fillers may also be present in the curable compositions. Generally, from 1 to 50 parts per hundred fluoroelastomer of a fluoropolymer filler is used. The fluoropolymer filler can be finely divided and easily dispersed as a solid at the highest temperature utilized in fabrication and curing of the fluoroelastomer composition. By solid, it is meant that the filler material, if partially crystalline, will have a crystalline melting temperature above the processing temperature(s) of the fluoroelastomer(s). The most efficient way to incorporate fluoropolymer filler is by blending latices; this procedure including various kinds of fluoro polymer filler is described in U.S. application Ser. No. 09/495600, filed Feb. 1, 2000.

One or more acid acceptors can also be added to the curable composition, though, where the presence of extractable metallic compounds is undesirable (such as for semiconductor applications) the use of inorganic acid acceptors should be minimized, and preferably avoided altogether. Commonly used acid acceptors include, for example, zinc oxide, calcium hydroxide, calcium carbonate, magnesium oxide, etc. These compounds generally are used in the fluoroelastomer formulation to bind any HF or other acids that might be generated at the high temperatures where fluoroelastomers must function.

The curable compositions can be prepared by mixing the fluoroelastomer, the curatives and/or catalysts, the selected additive or additives, and the other adjuvants, if any, in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. For best results, the temperature of the mixture during the mixing process typically should not rise above about 120° C. During mixing, it is preferable to distribute the components and adjuvants uniformly throughout the gum for effective cure. The mixture is then processed and shaped, for example, by extrusion (for example, in the shape of a hose or hose lining) or molding (for example, in the form of an O-ring seal). The shaped article can then be heated to cure the gum composition and form a cured elastomer article.

Processing of the compounded mixture (i.e., press cure) usually is conducted at a temperature between about 95° C. and about 230° C., preferably between about 150° C. and about 205° C., for a period of from 1 minute to 15 hours, typically from 5 minutes to 30 minutes. A pressure of between about 700 kPa and about 20,600 kPa is usually imposed on the compounded mixture in the mold. The molds first may be coated with a release agent and prebaked. The molded vulcanizate is then usually post-cured (e.g., ovencured) at a temperature usually between about 150° C. and about 300° C., typically at about 232° C., for a period of from about 2 hours to 50 hours or more depending on the cross-sectional thickness of the article. For thick sections, the temperature during the post cure is usually raised gradually from the lower limit of the range to the desired maximum temperature. The maximum temperature used is preferably about 300° C., and is held at this value for about 4 hours or more.

The curable compositions are useful in production of articles such as gaskets, tubing, and seals. Such articles are produced by molding a compounded formulation of the curable composition with various additives under pressure, curing the part, and then subjecting it to a post cure cycle. The curable compositions formulated without inorganic acid acceptors are particularly well suited for applications such as seals and gaskets for manufacturing semiconductor devices, and in seals for high temperature automotive uses.

Various modifications and alterations of this invention will become apparent to those skilled in the art without departing from the scope and spirit of the present invention, and it should be understood that this invention is not to be unduly limited to the illustrative embodiments set forth herein.

EXAMPLES

The following abbreviations are used in the examples:

AFPO: Ammonium-perfluoro octanoate
MV31: $CF_2=CFO(CF_2)_3OCF_3$
MV21: $CF_2=CFO(CF_2)_2OCF_3$
TFE: tetrafluoroethylene
BTFE: Bromotrifluoroethylene
CSM: cure site monomer
APS: Ammonium persulfate
PMVE: perfluoro methyl vinylether
PVE: emulsified perfluoro vinylether CN31: 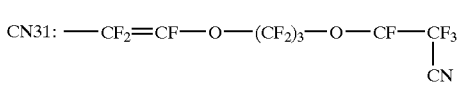

Test Methods

In the following examples, indicated results were obtained using the following test methods:

Cure rheology: Cure rheology tests were run on uncured, compounded samples using a Goettfert Elastograph 67.85 in accordance with ASTM D 5289-93a at 170° C., no pre-heat, 12 minute elapsed time, and a 0.2 degree arc. Both the minimum torque ($M_L$) and highest torque attained during a specified period of time when no plateau or maximum torque was obtained ($M_H$) were measured. Also measured were the time for the torque to increase 2 units above $M_L$ ("$t_s2$") the time for the torque to reach a value equal to $M_L+0.5(M_H-M_L)$ ("t'50"), and the time for the torque to reach $M_L+0.9(M_H-M_L)$ ("t'96").

Press-Cure samples: Unless otherwise noted, 150×150× 2.0 mm sheets were prepared for physical property determination by pressing at about 6.9 Mega Pascals (MPa) for 30 minutes at 177° C.

Tensile Strength at Break, Elongation at Break and Modulus at 100% Elongation were determined using ASTM D 412-92 on samples cut from the press-cure or post-cure sheet with ASTM Die D.

Hardness was determined using ASTM D 2240-85 Method A with a Type A-2 Shore Durometer. Units are reported in points.

Compression set was determined on O-rings using ASTM 395-89 Method B. The O-rings had a cross-section thickness of 0.139 in. (3.5 mm).

Glass transition temperatures were measured by DSC according ISO 12086.

Mooney viscosities was measured according ASTM D 1646.

Preparation of the perfluoro vinylether pre-emulsion

The liquid perfluoro vinylether is emulsified in water according to the following procedure: 500 g of the perfluoro vinylether and 500 g of deionized water containing 3 g APFO are emulsified with an "Ultra Turrax"-device (IKA Turrax T25S25N186) at a speed of 24000 rpm for 1 minute under a $N_2$-blanket. A milky-white emulsion is obtained having a pot life of at least 3 hours. The $O_2$-free perfluoro vinyl ether emulsion was then fed into the polymerization vessel.

Example 1

A 4 1-vessel was charged with 2.8 1 $O_2$-free water containing 10 g APFO and 8 g ammonia-oxalate. Additionally 150 g MV 31 pre-emulsified in water, 3 g BTFE and 180 g TFE were added and the polymerization was initiated at 60° C. by adding 30 ml of 0.2% $KMnO_4$-solution. The polymerization was continued at 60° C. and 9 bar pressure for 5 h, during this time 0.6 g $KMnO_4$, 8 g BTFE, 550 g TFE and 600 g MV 31 pre-emulsified in water were continuously added. The clear latex was coagulated by adding $MgCl_2$-solution, the washed gum was dried at 130° C. The resulting polymer has $T_G$ of −23° C., a Mooney value of 70 and consists of 76.9 mol-% TFE, 22.5 mol-% MV 31 and 0.6 mol-% BTFE.

Examples 2 to 7

The fluoroelastomers of examples 2 to 7 were prepared according to the polymerization method described in example 1 but with the exception that the monomers and amounts as indicated in table 1 were used.

Cure Properties

Example 3

100 Parts of Example 3 were compounded with 15 parts carbon black MT N990 and 1 part Urotropin (hexamethylene tetramine). A sheet of the compounded mixture was pressed for 30 minutes at 177° C. and then subsequently post-cured under nitrogen using the following conditions: 25–200° C. in 6 hrs., 200° C. for 16 hrs, 200° C.–250° C. in 2 hrs, 250° C. for 8 hrs, 250° C.–300° C. in 2 hrs and 300° C. for 16 hrs. The cured samples were tested to the indicated test methods, giving the following results:

| Tensile strength | 2,240 psi | 15.45 MPa |
|---|---|---|
| Elongation | 160% | |
| 100% Modulus | 1080 psi | 7.45 MPa |
| Shore A Hardness | 78 | |

Cure Properties

Examples 4, 5, 7

100 parts of the peroxide curable materials containing BTFE were compounded with 20 parts MT N-990, 2.50 parts ZnO, 1.35 parts Trigonox 101–50D, 3.50 parts Perkalink 301-50D and 1 part Struktol WB-222. The compounded materials show for example the following cure characteristics (Goettfert Elastograph 67.85):

| MDR 170° C. (50 cpm, 0.2° ARC) | | | |
|---|---|---|---|
| | Example 4 | Example 5 | Example 7 |
| ML (Nm) | 0.09 | 0.09 | 0.09 |
| MH (Nm) | 0.95 | 0.90 | 0.85 |
| Ts2 (min) | 0.6 | 0.6 | 0.7 |
| Tc50 (min) | 1.2 | 1.2 | 1.4 |
| Tc90 (min) | 3.4 | 3.2 | 3.5 |
| Vmax (Nm/min) | 0.69 | 0.66 | 0.55 |

Sheets were pressed from materials of Ex. 4, 5 and 7 press-cured for 10 min at 170° C. and post cured for 16 hrs at 230° C. The following properties were measured:

| | Example 4 | Example 5 | Example 7 |
|---|---|---|---|
| Tensile strength (MPa) | 15.7 | 13.2 | 14.6 |
| Elongation | 130 | 125 | 125 |
| 100% Modulus | 11.4 | 10.0 | 14.6 |
| Shore A Hardness | 77 | 73 | 84 |
| Compression set (70 hrs at 200° C.) | 22 | 23 | 28 |

TABLE 1

| Ex | Pre-charges TFE/PMVE/ PVE/CSM | PVE Monomer (g) | CSM (g) | Gaseous Monomers (g) | Initiator (g) | Polym. Temp. (° C.) | Polym. Pressure (bar) | Run Time (h) | Composition (mol %) TFE/PMVE/ PVE/CSM | $T_G$ (° C.) | Mooney Value |
|---|---|---|---|---|---|---|---|---|---|---|---|
| 2 | TFE:120 g PVE:120 g CSM: 3g | MV 31 (745) | BTFE (10) | TFE (390) | KMnO₄ (0.8) | 50 | 6 | 4.2 | 71/28/1 | −27 | 60 |
| 3 | TFE:190 PVE:200 CSM:10 | MV 31 (590) | CN 31 (33) | TFE (600) | KMnO₄ (0.4) | 60 | 9 | 7.5 | 77/−/22/1 | −23 | 55 |
| 4 | TFE:175 PMVE:60 PVE:180 CSM:4 | MV 31 (480) | BTFE 10 | TFE (550) PMVE (130) | KMnO₄ (0.4) | 50 | 9 | 5.3 | 73/9/17/1 | −16 | 70 |
| 5 | TFE:150 PMVE:120 PVE:200 CSM:4 | MV 31 580 | BTFE 10 | TFE 500 PMVE 160 | KMnO₄ 0.9 | 50 | 9 | 5 | 68/12/19/1 | −19 | 60 |
| 6 | TFE:140 PVE:350 CSM:3 | MV 21 (670) | BTFE (10) | TFE (400) | APS (3) | 70 | 9 | 4 | 75/−/24/1 | −11 | 45 |
| 7 | TFE:180 PVE:160 CSM:3 | MV 31 550 | BTFE 10 | TFE 600 | KMnO₄ 0.4 | 63 | 9 | 5 | 78/21/1 | −20 | 55 |

Comparative Example 1

A 4 1-vessel was charged with 2.8 1 O₂-free water containing 15 g APFO. 100 g TFE, 205 g PMVE and 7 g liquid CSM

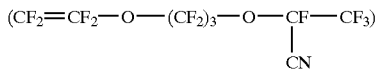

were added, the Polymerization was initiated at 68° C. by adding 5 g APS. The polymerization was continued at 68° C. and 12 bar pressure for 5.8 h during this time 550 g TFE, 475 PMVE and 67 g liquid CSM were continuously added. The resulting polymer showed by IR⁻ and NMR-analysis an incorporation of 1.1 mol CSM.

The polymerization was repeated, but pre-emulsified CSM was used, to obtain the same incorporation (1.1 mol %) in total only 44 g pre-emulsified CSM (5 g pre-emulsified CSM as precharge, 39 g pre-emulsified CSM was added during the course of polymerization) was necessary.

By using pre-emulsification technique less than 40% of liquid CSM is required to obtain the same incorporation.

Comparative Example 2

Example 2 was repeated under identical conditions, except that all the MV31 was not pre-emulsified. The resulting reaction mixture shows 2 phases, the lower phase is unreacted MV31 and the upper phase consists of a polymer which has only 13 mol % MV31 incorporated.

What is claimed is:

1. A method of making a curable fluoroelastomer comprising the stops of:
   pre-emulsifying one or more liquid perfluorovinyl ethers in water with the aid of a fluorinated emulsifier to obtain an aqueous emulsion, said liquid perfluorovinyl ether corresponding to the formula:

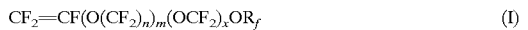

wherein n represents an integer of 1 to 6, m represents an integer of 1 to 3, x represents an integer of 0 to 3, with the proviso that the sum of x and m is at least 3 when n equals 1 and $R_f$ represents a perfluoroalkyl group having 1 to 6 carbon atoms; and
   copolymerizing said pre-emulsified liquid perfluorovinyl ethers with a gaseous fluorinated monomer selected from the group consisting of tetrafluoroethylene, chlorotrifluoroethylene, perfluorovinylmethyl ether and mixtures thereof in the presence of one or more cure site component;
   the amount of said one or more liquid perfluorovinyl ethers being sufficient so as to obtain a fluoroelastomer having a glass transition temperature of less than −10° C.

2. A method according to claim 1 wherein the total amount of said liquid perfluorovinyl ether, the amount of said gaseous fluorinated monomer and the amount of said cure site component are selected such so as to produce a fluoroelastomer that contains at least 50 mol % of a repeating unit derived from said gaseous fluorinated monomer, from 15 to 45 mol % of a repeating unit derived from said perfluorovinyl ether and from 0.1 to 5 mol % of cure sites derived from said cure site component.

3. A method according to claim 1 wherein said liquid perfluorovinyl ether is copolymerized with perfluoromethylvinyl ether, and tetrafluoroethylene and/or chlorotrifluoroethylene in the presence of a cure site component such that the resulting fluoroelastomer contains at least 50 mol % of repeating units derived from tetrafluoroethylene and/or chlorotrifluoroethylene, 1 to 15 mol % of repeating units derived from perfluoromethylvinyl ether, between 15 and 35 mol % of repeating units derived from said liquid perfluorovinyl ether and between 0.1 and 5 mol % of cure sites.

4. A method according to claim 1 wherein said liquid perfluorovinyl ether is represented by the formula $CF_2=CFO(CF_2)_pOCF_3$ wherein p is 2 or 3.

5. A method according to claim 1 wherein said cure site component comprises a halogen capable of participation in a peroxide cure reaction.

6. A method according to claim 5 wherein said cure site component is a fluorinated monomer comprising a halogen capable of participation in a peroxide cure reaction.

7. A method according to any of claims 1 to 4 wherein said cure site component is a fluorinated monomer having one or more nitrile groups.

8. A method according to claim 6 or 7 wherein said fluorinated monomer is a vinyl ether.

9. A method according to claim 1 wherein said cure site component comprises a liquid cure site monomer and wherein said liquid cure site monomer is pre-emulsified with the aid of a fluorinated emulsifier in water and said pre-emulsified liquid cure site component is then copolymerized with said gaseous fluorinated monomer and said pre-emulsified liquid perfluorovinyl ether.

10. A method according to claim 9 wherein said liquid cure site monomer and said liquid perfluorovinyl ether are pre-emulsified to obtain an aqueous emulsion comprising the liquid cure site monomer and the liquid perfluorovinyl ether.

11. A curable fluoroelastomer consisting essentially of 15 to 35 mol % of repeating units derived from one or more liquid perfluorovinyl ethers represented by the formula $CF_2=CF(O(CF_2)_n)_m(OCF_2)_xOR_f$, wherein n represents an integer of 1 to 6, m represents an integer of 1 to 3, x represents an integer of 0 to 3, and $R_f$ represents a perfluoroalkyl group having 1 to 6 carbon atoms, with the proviso that the sum of x and m is at least 3 when n equals 1, and with the further proviso that x equals 0 when n equals 2 and m equals 1; 0.1 to 5 mol % of cure site monomer, at least 50 mol % of units derived from a gaseous fluorinated monomer selected from the group consisting of tetrafluoroethylene, chlorotrifluoroethylene, perfluorovinylmethyl ether and mixtures thereof and 0 to 10 mol % of repeating units derived from further perfluorinated monomers other than said liquid perfluorovinyl ether and said gaseous fluorinated monomer.

12. A curable fluoroelastomer consisting essentially of:
   (a) 15 to 35 mol % of repeating units derived from one or more liquid perfluorovinyl ethers represented by the formula $CF_2=CF(O(CF_2)_n)_m(OCF_2)_xOR_f$, wherein n represents an integer of 1 to 6, m represents an integer of 1 to 3, x represents an integer of 0 to 3, and $R_f$ represents a perfluoroalkyl group having 1 to 6 carbon atoms, with the proviso that the sum of x and m is at least 3 when n equals 1, and with the further proviso that x equals 0 when n equals 2 and m equals 1,
   (b) 0.1 to 5 mol % of cure site component,
   (c) 1 to 15 mol % of repeating units derived from perfluoromethylvinyl ether,
   (d) at least 50 mole % of repeating units derived from tetrafluoroethylene and/or chlorotrifluoroethylene;
   and the sum of (a)+(b)+(c)+(d) adding up to 100 mol %.

13. A curable fluoroelastomer according to claim 11 or 12 wherein said liquid perfluorovinyl ether is represented by the formula $CF_2=CFO(CF_2)_pOCF_3$ wherein p is 2 or 3.

14. A curable fluoroelastomer composition comprising (i) a curable fluoroelastomer according to claims 11 to 13 and (ii) a curative and/or a catalyst.

15. A fluoroelastomer article obtainable by curing a curable fluoroelastomer composition as defined in claim 14.

16. Method of making a curable fluoroelastomer including one or more cure sites derived from a liquid cure site monomer, comprising the steps of pre-emulsifying one or more liquid cure site monomers in water with the aid of a fluorinated emulsifier to obtain an aqueous emulsion and copolymerizing the pre-emulsified liquid cure site monomers with one or more gaseous fluorinated monomers.

* * * * *

UNITED STATES PATENT AND TRADEMARK OFFICE
CERTIFICATE OF CORRECTION

PATENT NO. : 6,730,760 B2
DATED : May 4, 2004
INVENTOR(S) : Grootaert, Werner M. A.

It is certified that error appears in the above-identified patent and that said Letters Patent is hereby corrected as shown below:

<u>Title page,</u>
Item [57], ABSTRACT,
Line 1, delete the Abstact shown and insert the following
-- ABSTRACT
  A method of making a curable fluoroelastomer including copolymerizing a preemulsified perfluorovinyl ether with a gaseous fluorinated monomer in the presence of a cure site monomer to provide a fluoroelastomer having a glass transition temperature of less than –10°C. Also provided is a fluoroelastomer consisting essentially of a perfluorovinyl ether, a cure site component, perfluoromethylvinylether, and tetrafluoroethylene and/or chlorotrifluoroethylene. --

<u>Column 1,</u>
Line 36, "Tg" should be shown as -- $T_g$ --

<u>Column 2,</u>
Line 33, "In" should be shown as -- m --

<u>Column 8,</u>
Lines 55-60, delete the formula and insert the following new formula as shown below:

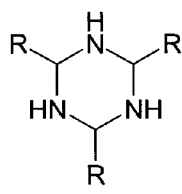

<u>Column 10,</u>
Line 59, "CN31: —$CF_2$=CF–O– $(CF_2)_3$–O–CF–$CF_3$
                                                                   |
                                                                  CN "

should be shown as  -- CN31: $CF_2$=CF–O–$(CF_2)_3$–O–CF–$CF_3$
                                                                   |
                                                                  CN --

<u>Columns 13-14,</u>
Table 1, Under the heading "Composition (mol%) TFE/PMVE/PVE/CSM", No. 6; "75/-124/1" should be shown as -- 75/-/24/1 --

UNITED STATES PATENT AND TRADEMARK OFFICE
CERTIFICATE OF CORRECTION

PATENT NO. : 6,730,760 B2
DATED : May 4, 2004
INVENTOR(S) : Grootaert, Werner M. A.

It is certified that error appears in the above-identified patent and that said Letters Patent is hereby corrected as shown below:

Column 13,
Line 58, "stops" should be shown as -- steps --

Column 14,
Lines 44-45, insert the word -- liquid -- after "said" and before "perfluorovinyl"

Signed and Sealed this

Twenty-fourth Day of August, 2004

JON W. DUDAS
*Director of the United States Patent and Trademark Office*